(12) United States Patent
Nasr et al.

(10) Patent No.: US 6,230,814 B1
(45) Date of Patent: May 15, 2001

(54) PROCESS FOR ENHANCING HYDROCARBON MOBILITY USING A STEAM ADDITIVE

(75) Inventors: Tawfik Noaman Nasr; Ezra Eddy Isaacs, both of Edmonton (CA)

(73) Assignee: Alberta Oil Sands Technology and Research Authority, Calgary ( * ) Notice: Subject to any disclaimer, the term of this patent is extended or adjusted under 35 U.S.C. 154(b) by 0 days.

(21) Appl. No.: 09/417,883

(22) Filed: Oct. 14, 1999

(51) Int. Cl.$^7$ ...................................................... E21B 43/24
(52) U.S. Cl. ...................... 166/400; 166/272.4; 166/303; 166/263; 507/904
(58) Field of Search .......................... 166/250.01, 252.1, 166/263, 272.3, 272.4, 303, 400, 401, 402, 403; 507/904

(56) References Cited

U.S. PATENT DOCUMENTS

| | | | |
|---|---|---|---|
| 2,897,894 | * 8/1959 | Draper et al. | 166/272.3 |
| 3,439,743 | * 4/1969 | Wyllie | 166/272.4 |
| 3,983,939 | * 10/1976 | Brown et al. | 166/401 X |
| 4,004,636 | * 1/1977 | Brown et al. | 166/401 |
| 4,085,803 | 4/1978 | Butler | 166/303 |
| 4,127,170 | 11/1978 | Redford . | |
| 4,207,945 | * 6/1980 | Hall et al. | 166/272.3 |
| 4,271,905 | 6/1981 | Redford et al. | 166/263 |
| 4,344,485 | 8/1982 | Butler | 166/271 |
| 4,558,740 | * 12/1985 | Yellig, Jr. | 166/272.3 |
| 4,592,424 | * 6/1986 | Long et al. | 166/272.3 X |
| 4,598,770 | 7/1986 | Shu et al. | 166/245 |
| 4,682,652 | 7/1987 | Huang et al. | 166/263 |
| 4,697,642 | 10/1987 | Vogel | 166/263 |
| 4,753,293 | 6/1988 | Bohn | 166/267 |
| 5,143,156 | 9/1992 | Bromley | 166/267 |
| 5,148,869 | 9/1992 | Sanchez | 166/303 |
| 5,407,009 | 4/1995 | Butler et al. | 166/266 |
| 5,417,283 | 5/1995 | Ejiogu et al. | 166/272 |
| 5,607,016 | 3/1997 | Butler | 166/263 |
| 5,685,371 | * 11/1997 | Richardson et al. | 166/303 |
| 5,771,973 | 6/1998 | Jensen et al. | 166/303 |
| 5,899,274 | 5/1999 | Frauenfeld et al. | 166/401 |

OTHER PUBLICATIONS

Sienko, Michell J. et al, Chemistry: Principles and Properties, McGraw–Hill Book Compnay, p. 166 1966.*
Mokrys, I.J. et al. "In–Situ Upgrading of Heavy Oils and Bitumen by Propane Deasphalting: The Vapex Process", SPE 25452, presented at the Production Operations Symposium held in Oklahoma City, OK, U.S.A in.Mar., 1993, p. 409–424.

* cited by examiner

Primary Examiner—George Suchfield
(74) Attorney, Agent, or Firm—Kurt D. Van Tassel; Deborah G. VandenHoff; Van Tassel & Associates

(57) ABSTRACT

A method for producing hydrocarbons from a subterranean formation comprises injecting steam and an additive into the formation. The additive has at least one nonaqueous fluid, which is selected so that the evaporation temperature of the additive is within about ±150° C. of the steam temperature at the operating pressure. Suitable additives include $C_1$ to $C_{25}$ hydrocarbons, and combinations thereof. At least a portion of the additive condenses in the formation. The mobility of the hydrocarbons is greater than that obtained using steam alone under substantially similar formation conditions.

26 Claims, 2 Drawing Sheets

PROCESS FOR ENHANCING HYDROCARBON MOBILITY USING A STEAM ADDITIVE

FIELD OF THE INVENTION

The present invention relates to the field of hydrocarbon production processes and, in particular, to steam-based hydrocarbon production processes.

BACKGROUND OF THE INVENTION

Hydrocarbons are recovered in conventional processes using fluids such as steam or solvent. For example, steam has been used in a Steam Assisted Gravity Drainage (SAGD) process as described in U.S. Pat. No. 4,344,485 (Butler, Aug. 17, 1982) and solvent has been used in a solvent-assisted gravity drainage process as described in U.S. Pat. No. 5,899,274 (Frauenfeld et al, May 4, 1999).

A combination of steam and solvent has also been proposed for increasing hydrocarbon production from subterranean formations.

In one proposed use of steam with a solvent, U.S. Pat. No. 5,148,869 (Sanchez, Sep. 22, 1992) discloses a process for recovering viscous hydrocarbon fluid from a reservoir penetrated by a single horizontal wellbore. Steam and a hydrocarbon-soluble gas are circulated through an outer compartment of a dual compartment single production/injection tubing string at a pressure at or below reservoir pressure, such that pressurized steam entry into the reservoir is substantially avoided. Gases, which are non-condensible under reservoir operating conditions, that Sanchez suggests can be used in his process include carbon dioxide, nitrogen, flue gas, and $C_1$–$C_4$ hydrocarbons. Steam heats the area surrounding the wellbore by transient conduction to reduce the viscosity of the hydrocarbons. Steam and gas then diffuse through perforations in the horizontal wellbore to form a vapor solvent zone predominantly consisting of steam and gas. When steam condenses, the solvent vapor, which is non-condensible under reservoir operating conditions, remains in the vapor phase. Thus, as steam and solvent vapor rise through the steam zone, a vapor solvent gradient is created due to collection of non-condensible vapor in the upper portion of the steam zone. Uncondensed steam and the non-condensible gas creates a gravity head to provide a driving force for oil to flow into the wellbore. However, there is no discussion in the Sanchez patent of the preferred solvent vapor characteristics or amount of solvent vapor relative to steam, except that the solvent vapor must be non-condensible at reservoir conditions.

In another proposed use of steam with a solvent, U.S. Pat. No. 4,697,642 (Vogel, Oct. 6, 1987) discloses a steam flooding and solvent flooding process in which steam and a vaporized solvent are used in a stepwise condensation process for recovery of immobile high viscosity hydrocarbons. The steam first heats the viscous hydrocarbons and the solvent subsequently dissolves in the viscous hydrocarbons to dramatically reduce their viscosity. In Vogel's process, the choice of solvent and the amount of solvent used is not considered critical. Vogel only suggests that the solvent should be a light, readily distillable liquid, which is miscible with heavy hydrocarbons. For example, Vogel suggests that solvents useful in his process include gasoline, kerosene, naphtha, gas well condensate, natural gas plant liquids, intermediate refinery streams, benzene, toluene, and various distillate and cracked products.

Also, Vogel suggests a broad range for solvent concentration ranging from 3 to 65% liquid volume. However, Vogel suggests that his process requires a high solvent concentration to operate with any efficacy. Vogel's process is tantamount to a miscible solvent flood process, wherein steam is first condensed to aid in warming the hydrocarbon and a substantial quantity of solvent vapor is subsequently condensed for dissolving the warm hydrocarbons, thereby yielding a "liquid hydrocarbon solution" with substantially reduced viscosity (see e.g., col. 9, lines 55–66 and col. 10, lines 28–31 and 37–54). Consequently, Vogel's dramatic reduction in the hydrocarbon viscosity results from a high solvent to hydrocarbon ratio (see e.g., col. 10, lines 42–45, about 1 part solvent to 2 parts viscous hydrocarbon). Such a high solvent to hydrocarbon ratio creates economic and solvent recovery challenges that could make the process cost prohibitive in many instances.

For example, Vogel teaches that solvent displaces hydrocarbon in pore spaces so that "the final liquid trapped in the pore spaces will be essentially 100% solvent, all the oil having previously been displaced and produced" (col. 5, lines 32–35). Solvent trapped in the pore spaces is recovered by injecting steam alone into the reservoir for a few months, after hydrocarbon production is stopped, to recover solvent from the reservoir. Also, in col. 10, at lines 42–60, Vogel states that his process "will be in equilibrium when one part solvent has gone into solution with two parts of the viscous hydrocarbons." Also, Vogel indicates that approximately one barrel of solvent is recovered for every two barrels of viscous hydrocarbons produced from the formation. Accordingly, Vogel's so-called "steam-solvent flood" process is effectively a steam flooding process followed by a miscible solvent flooding process that requires substantial quantities of solvent, which significantly increases the cost of the flooding process.

The co-injection of steam and solvent makes Vogel's process more convenient than the more conventional two-step flooding processes where steam is injected independently from the solvent. Also, Vogel's process ostensibly reduces the amount of solvent required compared to such an independent two-step steam flood and solvent flood process. However, as stated above, the amount of solvent required for Vogel's two-step steam and solvent flood process, produced by a stepwise steam and solvent condensation, is still significant. Consequently, the barrels of hydrocarbon produced per barrel of solvent used in Vogel's process is lower than desired for a cost effective hydrocarbon production process.

It is will understood by those skilled in the art that using large quantities of solvent for hydrocarbon production is expensive, as compared with the use of steam alone. Furthermore, the use of solvents incurs additional handling and disposal costs.

Accordingly, there is a need for an improved steam based hydrocarbon production process that significantly reduces the amount of solvent required to produce the hydrocarbons, without requiring a substantial increase in capital expenditures and/or operating costs.

SUMMARY OF THE INVENTION

According to one aspect of the present invention, there is provided a method for producing hydrocarbons from a subterranean formation that has at least one producing means which can communicate with at least a portion of said formation, said at least one producing means being used as a means for collecting said hydrocarbons, and at least one injection means for injecting a heated fluid composition comprising steam and an additive having at least one nonaqueous fluid, said method comprising: (a) selecting said at least one nonaqueous fluid so that the evaporation temperature of said additive is within about ±150° C. of the temperature of said steam under at least one predetermined operating pressure for said formation; (b) making said heated fluid composition from said steam and said additive; (c) injecting said heated fluid composition into said formation; (d) heating the hydrocarbons in said formation using said fluid composition; (e) condensing at least a portion of said additive from said fluid composition, wherein the mobility of the hydrocarbons in said formation is greater than the mobility of the hydrocarbons in said formation that would be obtained by heating said hydrocarbons using only said steam under substantially similar formation conditions; and (f) collecting said hydrocarbons.

BRIEF DESCRIPTION OF THE DRAWINGS

In drawings which illustrate embodiments of the present invention.

DETAILED DESCRIPTION OF THE PREFERRED EMBODIMENTS

Figure 1:
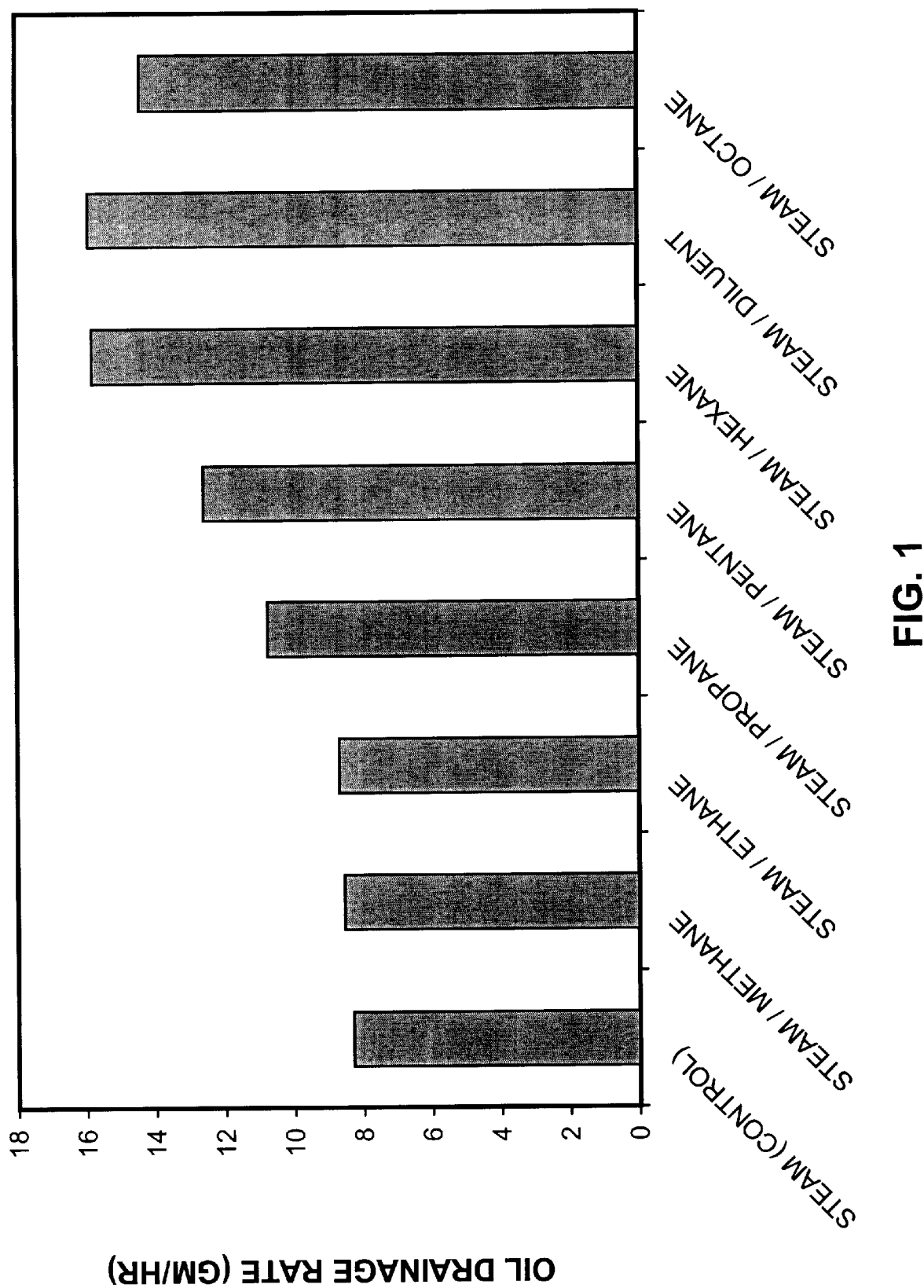
FIG. 1 is a graphical representation of oil drainage rates for steam and a number of different steam and additive mixtures at a pressure of 2.1 MPa and a steam temperature of 215° C.

In the present invention, hydrocarbons are produced from a subterranean formation having at least one wellbore, but preferably two or more wellbores.

In a single wellbore embodiment, the wellbore may contain, therein, one or more well conduits. Where a single well conduit is used in a single wellbore, the conduit could be used sequentially as a means for injecting a heated fluid and means for producing formation hydrocarbon fluids. In such a single wellbore embodiment, preferably, multiple well conduits are used in single wellbore and each conduit may be used either sequentially or concurrently to inject a heated fluid and produce formation hydrocarbon fluids.

In the multiple wellbore embodiment, there are at least two wellbores, each of which may contain one or more well conduits and each conduit may be used either sequentially or concurrently to inject a heated fluid and produce formation hydrocarbon fluids. In such a multiple wellbore embodiment, preferably, there is an injection wellbore having only one injection conduit and a producing wellbore having only one producing conduit, wherein the heated fluid and formation hydrocarbon fluids are, respectively, injected and produced substantially concurrent with each other.

For ease of discussion, reference herein to an injection well and a producing well includes single wellbore and multiple wellbore embodiments.

In the case of either the single or multiple wellbore embodiments of the invention, if fluid communication is not already established, it must be established, at some point in time, between the producing wellbore and a region of the subterranean formation containing the hydrocarbon fluids affected by the injected fluid. By "fluid communication" we mean that the mobility of either an injection fluid or hydrocarbon fluids in the subterranean formation, having some effective permeability, is sufficiently high so that such fluids can be produced at the producing wellbore under some predetermined operating pressure. For example, for some predetermined operating pressure, preferably, fluid communication is either enhanced or established by reducing the viscosity of the hydrocarbon fluids in the formation. However, fluid communication also may be enhanced or established by increasing the effective permeability of the region of the formation from which such hydrocarbon fluids are produced. As more fully discussed below, means for increasing the mobility of the hydrocarbon fluids include, without limitation, introducing a heated fluid and/or a solvent the region of the formation where the hydrocarbon fluids reside.

Hydrocarbons are produced by injecting a heated fluid composition into the injection well and producing the hydrocarbons from the producing well. By "fluid", we mean liquid, gas or a combination thereof.

By "fluid composition", we mean a fluid composition composed of at least steam and an additive. By "steam", we mean water vapor or a combination of liquid water and water vapor. It will be understood by those skilled in the art that steam may additionally contain trace elements, gases other than water vapor and/or other impurities. The temperature of steam can be in the range of from about 150° C. to about 350° C. However, as will be appreciated by those skilled in the art, the temperature of the steam is dependent on the operating pressure, which may range from about 100 psi to about 2,000 psi (about 690 kPa to about 13.8 MPa).

By "additive", we mean a fluid that has at least one nonaqueous fluid. Examples of suitable candidates for nonaqueous fluids that may satisfy the selection criteria discussed more fully below include, without limitation, $C_1$ to $C_{25}$ hydrocarbons, and combinations thereof. Examples of suitable $C_1$ to $C_{25}$ hydrocarbons include, without limitation, methane, ethane, propane, butane, pentane, hexane, heptane, octane, nonane, decane, undecane, dodecane, tridecane, tetradecane, diluent, kerosene, naphtha and combinations thereof.

By "diluent", we mean a mixture of hydrocarbon solvents comprising in the range of from about $C_2$ to about $C_{25}$. It will be understood that a diluent may comprise a predominant amount of one or more solvents in this range and may not contain all of the solvents in this range.

The nonaqueous fluid may be miscible or immiscible with the hydrocarbons being produced. A miscible fluid would likely produce a solution with the hydrocarbons. An immiscible fluid could produce a two-phase mixture with the hydrocarbons and/or an emulsion or micro-emulsion with the hydrocarbons. Preferably, the nonaqueous fluid is miscible with the hydrocarbons being produced.

In accordance with the present invention, the additive is selected so that the evaporation temperature of the additive is within about ±150° C. of the steam temperature under the operating pressure. By "within about ±150° C.", we mean that the evaporation temperature of the additive can be up to about 150° C. greater than the steam temperature at the operating pressure or up to about 150° C. less than the steam temperature at the operating pressure. By "operating pressure", we mean the heated fluid injection pressure in the region of the heated fluid composition/hydrocarbon interface of the subterranean formation.

It will be understood by those skilled in the art that the operating pressure may change during operation. Because the operating pressure affects the steam temperature, the additive may be changed during operation so that the additive evaporation temperature is within the desired range of the steam temperature.

Preferably, the evaporation temperature of the additive is within about ±100° C. of the steam temperature under the operating pressure. More preferably, the evaporation temperature of the additive is within about ±50° C. of the steam temperature under the operating pressure. Most preferably, the evaporation temperature of the additive is within about ±25° C. of the steam temperature under the operating pressure. Optimally, the evaporation temperature of the additive is within about ±15° C. to the steam temperature under the operating pressure.

For example, when the operating pressure is about 100 psi (690 kPa), the steam temperature is about 164° C. Accordingly, suitable nonaqueous fluids include, without limitation, one or more of the following: butane, which has an evaporation temperature within about −100° C. of the steam temperature; hexane, which has an evaporation temperature within about −25° C. of the steam temperature; heptane, which has an evaporation temperature within about +15° C. of the steam temperature; and decane, which has an evaporation temperature within about +10020 C. of the steam temperature.

As another example, when the operating pressure is about 1000 psi (6.9 MPa), the steam temperature is about 285° C. Accordingly, suitable nonaqueous fluids include, without limitation, one or more of the following: pentane, which has an evaporation temperature within about −100° C. of the steam temperature; heptane, which has an evaporation temperature within about −25° C. of the steam temperature; octane, which has an evaporation temperature within about +15° C. of the steam temperature; and dodecane, which has an evaporation temperature within about +100° C. of the steam temperature.

In another example, when the operating pressure is about 1,500 psi (10.3 MPa), the steam temperature is about 313° C. Accordingly, suitable nonaqueous fluids include, without limitation, one or more of the following: hexane, which has an evaporation temperature within about −100° C. of the steam temperature; octane, which has an evaporation temperature within about −25° C. of the steam temperature; nonane, which has an evaporation temperature within about +15° C. of the steam temperature; and tridecane, which has an evaporation temperature within about +100° C. of the steam temperature.

As a further example, when the operating pressure is about 2,000 psi (13.8 MPa), the steam temperature is about 335° C. Accordingly, suitable nonaqueous fluids include, without limitation, one or more of the following: hexane, which has an evaporation temperature within about −100° C. of the steam temperature; octane, which has an evaporation temperature within about −25° C. of the steam temperature; decane, which has an evaporation temperature within about +15° C. of the steam temperature; and tetradecane, which has an evaporation temperature within about +100° C. of the steam temperature.

With respect to an additive, which is a mixture of nonaqueous fluids, the bulk evaporation temperature of such mixture will fall between the highest and lowest evaporation temperature of the nonaqueous fluids comprising the mixture. Furthermore, such a bulk evaporation temperature can be used to determine whether the evaporation temperature of the additive is within a predetermined range from a selected steam temperature.

The above examples, with the exception of mixtures of the example non-aqueous fluids, are summarized in the following Table:

TABLE

| Operating Pressure | Operating Steam Temperature (° C.) | Example Non-Aqueous Fluid With Evaporation Temperature Within Specified Ranges From Steam Temperature | | | |
|---|---|---|---|---|---|
| | | −100° C. | −25° C. | +15° C. | +100° C. |
| 100 psi (690 kPa) | 164 | Butane | Hexane | Heptane | Decane |
| 1000 psi (6.9 MPa) | 285 | Pentane | Heptane | Octane | Dodecane |
| 1500 psi (10.3 MPa) | 313 | Hexane | Octane | Nonane | Tridecane |
| 2000 psi (13.8 MPa) | 335 | Hexane | Octane | Decane | Tetradecane |

The above operating pressures, steam temperatures, temperature ranges and additives are provided for illustrative purposes only and are not intended to be limiting examples of suitable additive selections. It will be understood by those skilled in the art, using the guidance provided herein, that a number of other suitable additives can be selected for the example operating pressures. Also, it will be understood by those skilled in the art, using the guidance provided herein, that other additives can be used at operating pressures other than those presented in the above examples.

It will be understood that in a combination of nonaqueous fluids, the evaporation temperature of the additive may differ from the evaporation temperatures of the individual nonaqueous fluids. Accordingly, in the case where a combination of nonaqueous fluids is used, the evaporation temperature of the additive may be a bulk evaporation temperature.

It is presently believed that when the additive's evaporation temperature is greater than the steam temperature, the additive will begin to condense before steam condensation occurs. Likewise, when the additive's evaporation temperature is less than the steam temperature, steam will begin to condense before additive condensation occurs. Also, when the evaporation temperature of the additive is about equal to the steam temperature, it is presently believed that steam and the additive will begin to condense substantially simultaneously.

Selection of a nonaqueous fluid having an evaporation temperature within the specified temperature range of the steam temperature at a predetermined operating pressure results in increased hydrocarbon mobility in the reservoir to the producing well. It will be understood by those skilled in the art that, as a general rule, hydrocarbon mobility is a measure of the effective permeability of the formation divided by the hydrocarbon fluid's viscosity. By "increased hydrocarbon mobility", we mean that the hydrocarbon has decreased viscosity and/or reduced interfacial tension, as compared with a hydrocarbon produced using only steam under substantially similar formation conditions.

Without being bound by theory, it is believed that as the nonaqueous fluid condenses, the viscosity of the hydrocarbons at the steam-hydrocarbon interface decreases. As the steam front advances, further heating the reservoir, the condensed nonaqueous additive evaporates. It is believed that the condensation-evaporation mechanism provides an additional driving force due to the expanded volume of the additive as a result of the phase change. It is further believed that the combination of reduced viscosity and the condensation-evaporation driving force increase mobility of the hydrocarbons to the producing well. In addition, the refluxing additive allows the advantages of the present invention to be realized with a small amount of solvent, as compared to other hydrocarbon production processes known heretofore.

Preferably, the amount of additive in the heated fluid composition is in the range of from about 0.1% to about 5% liquid volume of the fluid composition. By "% liquid volume", we mean the liquid volume of additive divided by the sum of the liquid volume of additive and the liquid volume of steam in the fluid composition. More preferably, the amount of additive in the heated fluid composition is in the range of from about 0.5% to about 3% liquid volume of the fluid composition. Most preferably, the amount of additive in the heated fluid composition is in the range of from about 1% to about 2% liquid volume of the fluid composition. For economic reasons, preferably the amount of additive in the heated fluid composition is less than about 3% of the liquid volume of the fluid composition.

Determining the liquid volume of a fluid composition is well known to those skilled in the art. For example, the flow rate of steam can be measured, using an orifice meter, and the equivalent liquid volume at the operating pressure can be determined accordingly. Likewise, an additive can be delivered at a predetermined flow rate through a solvent injection pump to correspond to a predetermined liquid volume at the operating pressure.

In one embodiment of the invention, the heated fluid composition may be injected into an injection well by first mixing the steam and additive, preferably in the gas phase, prior to injection. In a second embodiment of the invention, separate lines for steam and additive can be used to independently, but concurrently, introduce steam and additive into the injection well, where the steam and additive will mix. A separate additive injection is particularly suitable for retrofitting existing processes. Also, it may be easier to monitor the additive flow rate, where separate steam and additive lines are used to inject the heated fluid composition.

In one embodiment of the invention, steam and additive may be co-injected. In another embodiment of the invention, steam injection may be alternated with steam/additive co-injection.

In one preferred embodiment, the present invention may be used to produce heavy, viscous oil from subterranean reservoirs, such as those found in the Oil Sands of Alberta, Canada. Examples of suitable hydrocarbon production processes, in which the invention may be used, include, without limitation, cyclic steam stimulation ("CSS"), steam-assisted gravity drainage ("SAGD") and steam flooding.

In a typical SAGD process, initial thermal communication between an injection well and a producing well is established by injection of steam or low viscosity hydrocarbon solvent into one of the wells and production of reservoir fluids from the other well. Alternatively, heated fluid may be circulated in one or both wells. In a further alternative, a combination of these methods may be employed. In reservoirs where communication between an injection well and a producing well is already established, the SAGD process can be implemented immediately. Steam is then injected into the injection well to heat the formation. As the steam condenses, hydrocarbons are mobilized by liberated heat from condensing steam and drain by gravity to the producing well. Hydrocarbons are produced continuously through the producing well at rates which result in substantially separate oil and condensate flowpaths without excessive steam bypass. In a preferred embodiment of the SAGD process, the injection and producing wells are superposed horizontal wells, spaced about 5 meters apart, near the bottom of the formation. However, it is not required to operate in the preferred embodiment to practice the present invention.

CSS is also commonly referred to as a "huff and puff" process. Steam is injected into the formation, commonly at a pressure above the fracture pressure, through a vertical well for a period of time. The well is then shut in for several days to several months, referred to as the "soak" period. Then the well is opened to produce heated oil and steam condensate until the production rate declines. The entire cycle is then repeated. In the course of this process, an expanding hydrocarbon depleted zone is gradually developed. Oil draining from the heated zone is produced through the well during the production phase and is replaced, at least in part, with steam during the injection phase. Thereafter, newly injected steam, together with steam already present, moves through the depleted zone to its boundary, to supply heat to the cold oil at the boundary.

In steam flooding, steam is injected through an injection well to thermally drive the hydrocarbons to the producing well. The steam convectively mixes with hydrocarbons to lower the viscosity and mobilize the hydrocarbons. The mobilized hydrocarbons are driven by steam to the producing well.

The present invention may be practiced in a variety of arrangements of injection and producing wells. For example, without limitation, the invention may be practiced with (a) a single horizontal well, used either simultaneously as injection and producing wells or alternating injection and producing wells, (b) two or more horizontal wells, at least one acting as an injection well and at least one acting as a producing well, which can be arranged with one disposed directly above the other, offset horizontally from the other, perpendicular or at another angle to the other, etc., (c) two or more vertical wells, at least one being used as an injection well and at least one being used as a producing well, or (d) a combination of one or more horizontal wells and one or more vertical wells.

The following non-limiting example of an embodiment of the present invention is provided for illustrative purposes only.

EXAMPLE

A high pressure/high temperature test core (0.1 m diameter, 1.7 m high) was used to test one embodiment of the present invention in a SAGD process. The test core was packed with a sand having a permeability of 1.5 Darcy, similar to that found in the field. The sand was saturated with water to render it water-wet. The water was then displaced with oil containing methane as an initial solution gas to simulate a gas-to-oil ratio ("GOR") of 7.2, similar to that found in the field.

Tests were conducted with a heated fluid composition and a variety of additives at a liquid volume of about 1.5%. Each test was conducted at a pressure of 2.1 MPa (304.6 psi) and a steam injection temperature of 215° C. Additives tested included methane, ethane, propane, pentane, hexane, diluent and octane. The diluent used in the example primarily contained $C_4$ to $C_{15}$ hydrocarbons, with the $C_5$ to $C_9$ fraction representing about 50% by volume of the diluent.

A Control test using steam without additive was used for comparison with steam-additive tests.

The oil drainage rate was measured for the Control and steam-additive tests.

FIG. 1 illustrates the oil drainage rate results for the Control and steam-additive tests.

Figure 2:
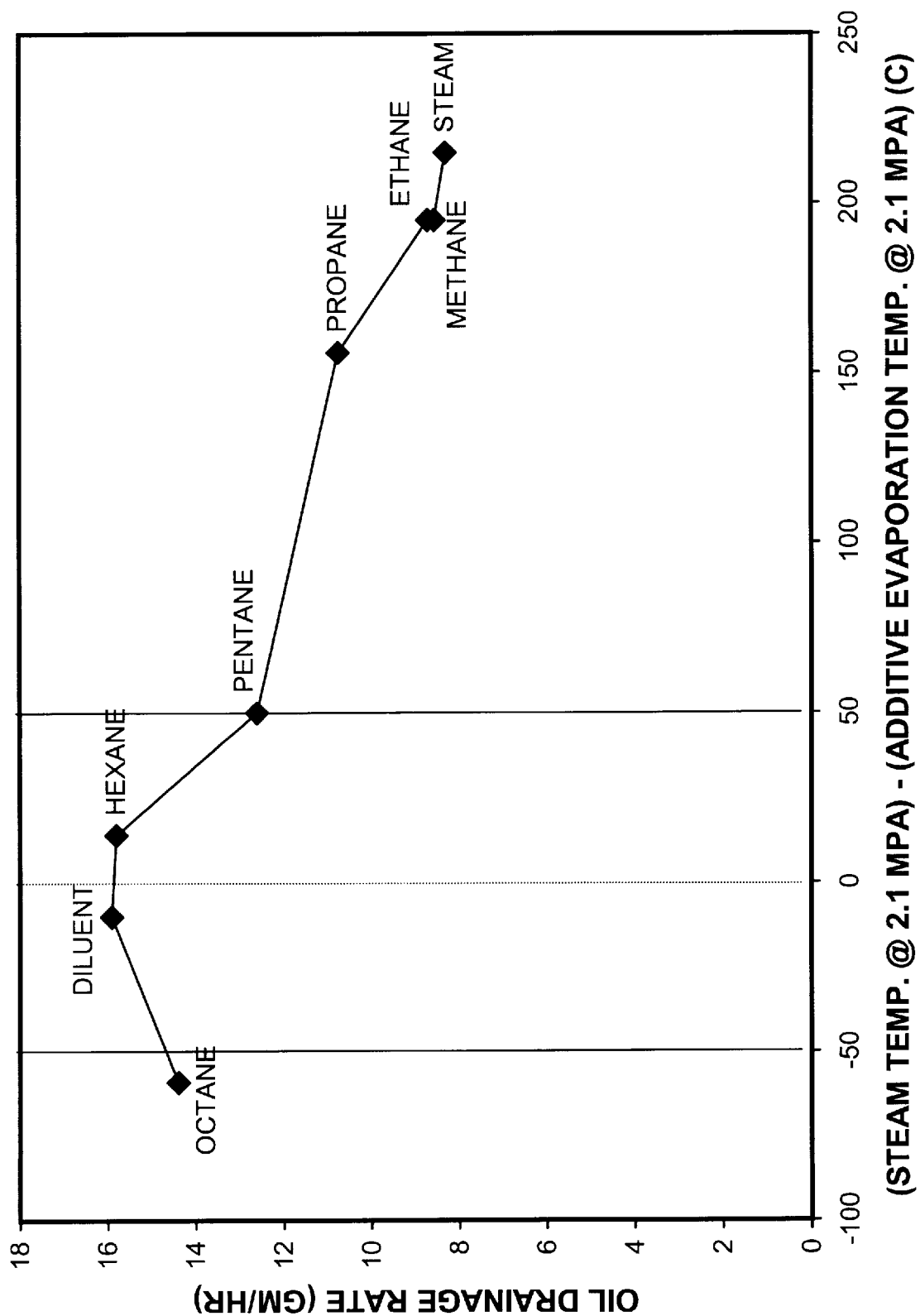
FIG. 2 is a graphical representation of the relationship between enhanced oil drainage rates and the proximity of the additive evaporation temperature and the steam temperature.

To determine whether the evaporation temperature of an additive is within a predetermined range from a selected steam temperature at a predetermined operating pressure, such predetermined range is calculated by taking the difference between the steam temperature, at the predetermined operating pressure, and the additive evaporation temperature, at the same predetermined operating pressure. This calculation is made in the same manner regardless of whether the evaporation temperature is the evaporation temperature for a single nonaqueous fluid additive or is the bulk evaporation temperature of a mixture of two or more nonaqueous fluids. A bulk evaporation temperature is determinable by laboratory testing procedures known to those skilled in the art. Accordingly, FIG. 2 illustrates the oil drainage rate versus the difference between the steam temperature and the additive evaporation temperature, each at a predetermined operating pressure of 2.1 MPa (304.6 psi). Also, the evaporation temperature used for the diluent shown in FIG. 2 is the bulk evaporation temperature of a hydrocarbon mixture comprising primarily $C_4$ to $C_{15}$, with the $C_5$ to $C_9$ fraction representing about 50% by volume of the diluent.

Under the test conditions, methane and ethane were non-condensible. As shown in FIG. 1, there was a slight increase in the oil drainage rate for the steam/methane and steam/ethane tests, as compared with the Control. However, there was dramatic increase in the oil drainage rate for the condensible additives. The steam/propane test resulted in an increase of 27% in the oil drainage rate, as compared with the Control, while the steam/pentane test resulted in an increase of 47% in the oil drainage rate, as compared with the Control. The oil drainage rates for the steam/hexane and steam/diluent tests were approximately double the oil drainage rate of the Control.

FIG. 2 illustrates how the oil drainage rate increases as the evaporation temperature of the additive approaches that of the steam temperature.

Consequently, in view of these results, the Applicants currently believe that at least three important factors for selecting the appropriate additive(s) are its/their (a) condensibility under reservoir operating conditions, (b) evaporation temperature relative to the steam temperature under reservoir operating conditions and (c) concentration of additive in steam.

Preferred embodiments of the present invention have been described. It will be understood that the foregoing is provided for illustrative purposes only and that other embodiments and applications can be employed without departing from the true scope of the invention described in the following claims.

We claim:

1. A method for producing hydrocarbons from a subterranean formation that has at least one producing means which can communicate with at least a portion of said formation, said at least one producing means being used as a means for collecting said hydrocarbons, and at least one injection means for injecting a heated fluid composition comprising steam and an additive having at least one nonaqueous fluid, said method comprising:
   a) selecting said at least one nonaqueous fluid so that the evaporation temperature of said additive is within about ±150° C. of the temperature of said steam under at least one predetermined operating pressure for said formation;
   b) making said heated fluid composition from said steam and said additive;
   c) injecting said heated fluid composition into said formation;
   d) heating the hydrocarbons in said formation using said fluid composition;
   e) condensing at least a portion of said additive from said fluid composition, wherein the mobility of the hydrocarbons in said formation is greater than the mobility of the hydrocarbons in said formation that would be obtained by heating said hydrocarbons using only said steam under substantially similar formation conditions; and
   f) collecting said hydrocarbons.

2. The method of claim 1 wherein the portion of said additive in step (e) begins condensing after a portion of said steam has condensed in said formation.

3. The method of claim 1 wherein the portion of said additive in step (e) begins condensing prior to said steam condensing in said formation.

4. The method of claim 1 wherein the portion of said additive in step (e) condenses substantially simultaneously with said steam in said formation.

5. The method of claim 1 wherein the concentration of said additive is in the range of from about 0.1% to about 5% liquid volume of said heated fluid mixture.

6. The method of claim 1 wherein the concentration of said additive is in the range of from about 0.5% to about 3% liquid volume of said heated fluid mixture.

7. The method of claim 1 wherein the concentration of said additive is in the range of from about 1% to about 2% liquid volume of said heated fluid mixture.

8. The method of claim 1 wherein the additive of step (a) has an evaporation temperature within about ±100° C. of said steam temperature, under at least one predetermined operating pressure of said formation.

9. The method of claim 1 wherein the additive of step (a) has an evaporation temperature within about ±75° C. of said steam temperature, under at least one predetermined operating pressure of said formation.

10. The method of claim 1 wherein the additive of step (a) has an evaporation temperature within about ±50° C. of said steam temperature, under at least one predetermined operating pressure of said formation.

11. The method of claim 1 wherein the additive of step (a) has an evaporation temperature within about ±25° C. of said steam temperature, under at least one predetermined operating pressure of said formation.

12. The method of claim 1 wherein the additive of step (a) has an evaporation temperature within about ±20° C. of said steam temperature, under at least one predetermined operating pressure of said formation.

13. The method of claim 1 wherein the additive of step (a) has an evaporation temperature within about ±15° C. of said steam temperature, under at least one predetermined operating pressure of said formation.

14. The method of claim 1 wherein the additive of step (a) has an evaporation temperature about equal to said steam temperature, under at least one predetermined operating pressure of said formation.

15. The method of claim 1 wherein said nonaqueous fluid is selected from the group consisting of $C_1$ to $C_{25}$ hydrocarbons and combinations thereof.

16. The method of claim 15 wherein said $C_1$ to $C_{25}$ hydrocarbon is selected from the group consisting of methane, ethane, propane, butane, pentane, hexane, heptane, octane, nonane, decane, undecane, dodecane, tridecane, tetradecane, diluent, kerosene, naphtha and combinations thereof.

17. The method of claim 1 wherein said method is used in a steam-based hydrocarbon producing process.

18. The method of claim 17 wherein said steam-based hydrocarbon producing process is a steam assisted gravity drainage process.

19. The method of claim 17 wherein said steam-based hydrocarbon producing process is a cyclic steam stimulation process.

20. The method of claim 17 wherein said steam-based hydrocarbon producing process is a steam flooding process.

21. The method of claim 1 wherein said heated fluid composition is made by co-injecting said steam and said additive.

22. The method of claim 1 wherein said heated fluid composition is made prior to injecting said fluid composition into said formation.

23. The method of claim 22 wherein said heated fluid composition is co-injected with additional steam.

24. The method of claim 1 wherein injection of said heated fluid composition is alternated with injection of steam.

25. The method of claim 1 wherein said producing means and said injection means are disposed in a single wellbore.

26. The method of claim 1 wherein said producing means is disposed in at least a first wellbore and said injection means is disposed in at least a second wellbore.

\* \* \* \* \*